United States Patent
Guo et al.

(10) Patent No.: US 9,268,784 B1
(45) Date of Patent: Feb. 23, 2016

(54) CONTENT-AWARE DISTRIBUTED DEDUPLICATING STORAGE SYSTEM BASED ON LOCALITY-SENSITIVE HASHING

(71) Applicant: EMC Corporation, Hopkinton, MA (US)

(72) Inventors: Feng Guo, Shanghai (CN); Qiyan Chen, Shanghai (CN); Mandavilli Navneeth Rao, Santa Clara, CA (US); Lintao Wan, Shanghai (CN); Dong Xiang, Shanghai (CN)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/622,553

(22) Filed: Sep. 19, 2012

(51) Int. Cl.
G06F 17/30 (2006.01)
G06F 3/06 (2006.01)

(52) U.S. Cl.
CPC ........ *G06F 17/30156* (2013.01); *G06F 3/0641* (2013.01)

(58) Field of Classification Search
None
See application file for complete search history.

(56) References Cited

U.S. PATENT DOCUMENTS

| | | | |
|---|---|---|---|
| 8,266,115 B1 * | 9/2012 | Park et al. ...................... | 707/692 |
| 8,412,680 B1 * | 4/2013 | Gokhale et al. ................ | 707/654 |
| 8,898,120 B1 * | 11/2014 | Efstathopoulos ............... | 707/692 |
| 2007/0282915 A1 | 12/2007 | Vosshall et al. | |
| 2009/0122724 A1 | 5/2009 | Rosenberg | |
| 2011/0055621 A1 | 3/2011 | Mandagere et al. | |
| 2011/0099351 A1 * | 4/2011 | Condict ......................... | 711/216 |
| 2011/0145207 A1 * | 6/2011 | Agrawal et al. ............... | 707/692 |
| 2011/0219205 A1 | 9/2011 | Wright | |
| 2011/0231362 A1 * | 9/2011 | Attarde et al. ................. | 707/609 |
| 2012/0158672 A1 * | 6/2012 | Oltean et al. .................. | 707/692 |
| 2012/0166403 A1 * | 6/2012 | Kim et al. ...................... | 707/692 |
| 2013/0041872 A1 | 2/2013 | Aizman et al. | |
| 2013/0061089 A1 * | 3/2013 | Valiyaparambil et al. ...... | 714/15 |

OTHER PUBLICATIONS

"Implementing IBM Storage Data Deduplication Solutions"; Mar. 2011; IBM Redbooks; IBM Form No. SG24-7888-00; pp. 32-35, 58-59, 104, 259-264; Available online at: http://www.redbooks.ibm.com/abstracts/sg247888.html.*

* cited by examiner

*Primary Examiner* — Alex Gofman
*Assistant Examiner* — Umar Mian
(74) *Attorney, Agent, or Firm* — Van Pelt, Yi & James LLP

(57) ABSTRACT

Backup data is processed by obtaining a set of metadata associated with backup data. A locality-sensitive hash key is generated for the backup data based at least in part on the set of metadata. The backup data is assigned to one of a plurality of deduplication nodes based at least in part on the locality-sensitive hash key.

24 Claims, 8 Drawing Sheets

| Metadata Field | Metadata Value |
|---|---|
| File Type | Microsoft Word, PDF, HTML, JPEG |
| OS | Microsoft Windows, LINUX, Apple MacOS |
| Source Org. | Legal Dept., Engineering Dept., Finance Dept. |
| Encryption | Yes, No |
| Permissions | Read Only, Writeable |
| Backup Level | Full Backup, Incremental Backup, Differential Backup |
| Backup Timestamp | Backup Time, Backup Day |
| Backup Retention Policy | Keep Forever, Delete When Space Needed, Keep At Least 1 Year |
| Backup Data Type | File Based Backup, Block Based Backup |

CONTENT-AWARE DISTRIBUTED DEDUPLICATING STORAGE SYSTEM BASED ON LOCALITY-SENSITIVE HASHING

BACKGROUND OF THE INVENTION

Deduplication storage systems, such as EMC Data Domain storage systems, perform deduplication to minimize the amount of storage consumed. Instead of storing two copies of the same piece of data, a single copy is stored (e.g., with two links or identifiers referencing the single copy). In backup and/or archiving applications, significant storage savings can be achieved since backups and archives tend to have copies of identical or substantially similar data. It would be desirable if distributed deduplication storage systems operated in a manner which attempts to optimize deduplication efficiency.

BRIEF DESCRIPTION OF THE DRAWINGS

Various embodiments of the invention are disclosed in the following detailed description and the accompanying drawings.

FIG. 3 is a diagram showing an embodiment of metadata associated with backup data.

DETAILED DESCRIPTION

Figure 1:
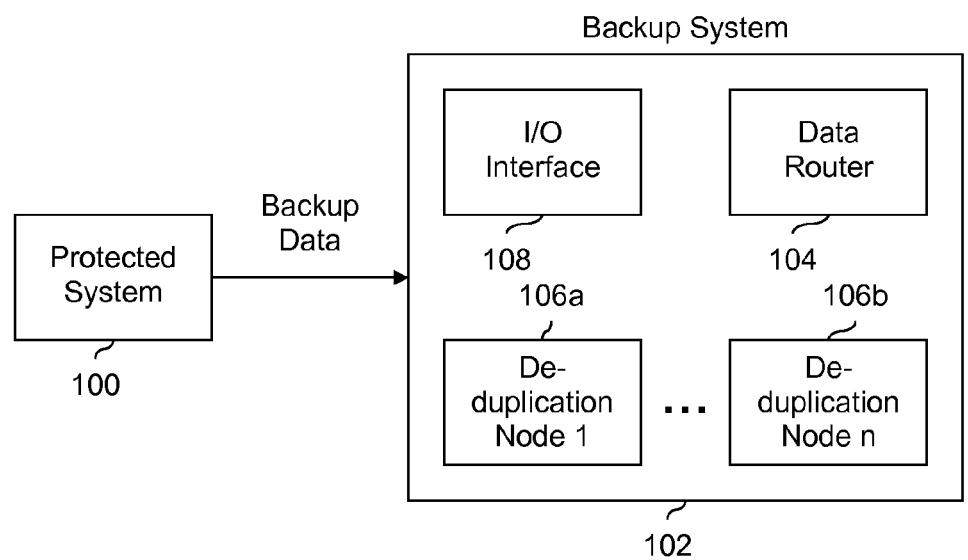
FIG. 1 is a diagram showing an embodiment of a backup system which uses locality-sensitive hashing to assign backup data to one of a plurality of deduplication nodes.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A technique to assign backup data to one of a plurality of deduplication nodes is described herein. In some embodiments, the deduplication nodes are part of a deduplication storage system and/or a backup system. A set of metadata associated with the backup data is obtained and a locality-sensitive hash key is generated for the backup data based at least in part on the set of metadata. In some embodiments, metadata used to generate a locality-sensitive hash key includes not just what is conventionally considered metadata (e.g., time of creation, owner, and so on) but the data itself and/or any characteristics derived or extracted from the data. In some embodiments, there are hundreds or thousands of pieces or types of metadata available, but only a handful (e.g., three or fewer) types or kinds of metadata are used to generate a locality-sensitive hash key. In some embodiments, the metadata to use in generating a locality-sensitive hash key is specified via a list and/or is determined during a design phase of a storage system. In some embodiments, metadata used to generate a locality-sensitive hash key is dynamically chosen at run-time, algorithmically, and/or is based on an on-going analysis of the environment and system in which the deduplication is being run. Backup data is assigned to one of a plurality of deduplication nodes based at least in part on the locality-sensitive hash key.

FIG. 1 is a diagram showing an embodiment of a backup system which uses locality-sensitive hashing to assign backup data to one of a plurality of deduplication nodes. In the example shown, protected system 100 is protected (e.g., from device failure, corruption, and/or accidental deletion) using backup system 102. In various embodiments, protected system 100 is a desktop (e.g., single user) device, an application server (e.g., accessed by many users), a web server, a file server, etc. Backup data is sent from protected system 100 to backup system 102 where it is processed and stored. In various embodiments, the backup data exchanged between protected system 100 and backup system 102 is associated with a full, incremental, or differential backup; a file-based or a block-based backup; etc. In the event some data on protected system 100 is no longer accessible (e.g., because of accidental deletion or device failure), the backup data stored on backup system 102 is retrieved and restored on protected system 100 and/or redirected to any other target system.

In this example, backup system 102 is a deduplication backup system, such as EMC Data Domain, which uses deduplication to minimize the amount of (e.g., backup) storage consumed. For example, if data router 104 sends a piece of backup data to deduplication node 106a and then some time later sends an identical copy to deduplication node 106a, only a single copy is physically or actually stored. (In one example of how this may occur, two full backups may occur and a given file may be unchanged between the two full backups.)

Input/output (I/O) interface 108 may record two identifiers, links, or references so that backup system 102 knows that it was given identical backup data at two different times and is able to return the backup data to protected system 100 if so requested. For example, I/O interface 108 may keep one or more local references: local path (deduplication node 106a):: (remote path). In the event the data is requested, I/O interface 108 follows the local file reference to fetch the data from the appropriate deduplication node (in this example, deduplication node 106a).

In another example, data router 104 forwards two pieces of similar backup data to deduplication node 106a. For example, the backup data may be identical except for some additional content in one but not the other, or the content may be the same but some piece of metadata has changed (e.g., the file permissions have changed from read-only to writeable). In some embodiments, a deduplication node in such situations detects the similarity between the two, stores a single copy of a matching portion (e.g., matching metadata and/or matching content), and stores the additional or different content and/or metadata, remembering how to reconstruct the original backup data from what was saved. In some embodiments, a deduplication node is able to perform deduplication on identical or similar backup data even if other data is received between the two identical or similar pieces of backup data.

Deduplication (at least in this embodiment) cannot be detected and performed across deduplication nodes, so if a piece of backup data is sent to deduplication node 106a and an identical copy is sent to deduplication node 106b, then each deduplication node will store a copy (which is inefficient). In some cases deduplication can be performed across nodes, but it is inefficient (e.g., with respect to time) if it requires multiple hops for the data to reach the right or best node. Some or all of these issues may be addressed by data router 104 using locality-sensitive hashing to assign the backup data received from protected system 100 to one of deduplication nodes 106a-106b. This process is described in further detail below.

Although this example shows data router 104 and deduplication nodes 106a and 106b in a backup system, the technique described herein may be used in a variety of applications or systems. For example, a primary system (e.g., protected system 100) may use the technique described herein to efficiently store data on itself. This may be useful for devices with limited storage (e.g., small and/or mobile devices, such as mobile telephones). In some embodiments, system 102 is an archiving system. In some embodiments there is a "data router" sitting above a cluster of multi-node deduplication systems, directing backup data to the correct system based on locality-sensitive hashing. Further routing to a specific node within the system may be done by another internal data router. These are some exemplary applications of the technique and are not intended to be limiting.

In some embodiments, protected system 100 is a distributed protected system (i.e., having a plurality of protected nodes). In some embodiments, I/O interface 108 and/or data router 104 performs some additional management to accommodate a distributed protected system. For example, the namespace may only be unique for each node in the protected system and there may be no guarantee of unique names or paths across the entire distributed protected system (e.g., it may be possible for a file called ".permissions" to exist at /user/home/ on two different LINUX devices). In some embodiments, I/O interface 108 records or annotates each piece of backup data received with the protected node from which it was received. In this way, names or paths across the entire distributed protected system are made unique. In some other embodiments, a global file namespace may be maintained in some other manner.

Figure 2:
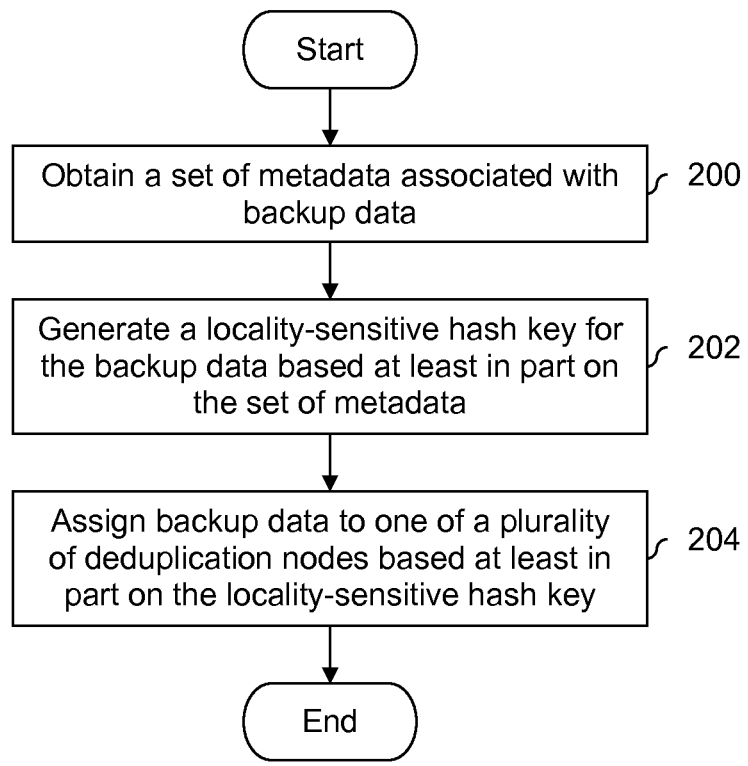
FIG. 2 is a flowchart illustrating an embodiment of a process for assigning backup data to one of a plurality of deduplication nodes using locality-sensitive hashing.

FIG. 2 is a flowchart illustrating an embodiment of a process for assigning backup data to one of a plurality of deduplication nodes using locality-sensitive hashing. In some embodiments, the process is performed by data router 104 in FIG. 1 when deciding which deduplication node to assign backup data to.

At 200, a set of metadata associated with backup data is obtained. In some embodiments, there are hundreds or thousands of possible pieces of metadata, of which a few are obtained at 200. In various embodiments, obtaining at 200 includes algorithmically selecting metadata based on policy requirements, heuristic analysis and/or environmental conditions extant at the time of backup. A valuable reason to cull the metadata chosen to generate a locality-sensitive hash key is that it maximizes the amount of deduplication. The right choice of metadata may enhance the "locality" of a locality-sensitive hash.

FIG. 3 is a diagram showing an embodiment of metadata associated with backup data. For brevity, in this example, each piece of backup data (not shown) has 9 pieces of metadata associated with it. In FIG. 3, metadata 300 relates to an intrinsic characteristic of the source data which would still be present and/or meaningful even if no backup were performed. Metadata 300 includes file type or extension (e.g., Microsoft Word (.doc), Portable Document Format (PDF), HyperText Markup Language (HTML), Joint Photographic Experts Group (JPEG), etc.), an operating system associated with the backup data (e.g., Microsoft Windows, LINUX, Apple MacOS, etc.), a source organization (e.g., whether the backup data originated from the Legal Department, Engineering Department, or Finance Department of a company), encryption (e.g., whether the backup data includes encrypted data or not), and permissions (e.g., whether the data is read only or writeable).

Metadata 302 relates to the backup and includes backup level (e.g., a full backup versus an incremental or differential backup), a time and/or date at which a backup occurred, a retention policy or setting associated with the backup (e.g., the backup is permitted to be deleted when space is needed, the backup should be kept at least one year, the backup should be kept indefinitely, etc.), and a backup data type (e.g., file based backup versus block based backup).

In this example, of the 9 total pieces of metadata, only 2 are used to generate a locality-sensitive hash key. Specifically, operating system 304 and file type 306 are used. In some other embodiments, one or more of the following pieces of metadata are used: IP address; domain name; hostname; OS version; application; application version; file name; file type; file owner; creation time; modification time; language; format; whether data is text, numeric, alpha-numeric, or graphic; executive/VIP content; backup application; backup protocol; backup format; and/or derived keys from the actual data content.

Returning to FIG. 2, at 202, a locality-sensitive hash key is generated for the backup data based at least in part on the set of metadata. In one example of step 202, if the set obtained at 202 includes operating system and file type, then for a piece of backup data where the metadata values are Microsoft Windows and Microsoft Word, those values are input to a locality-sensitive hash and a hash key is generated. The technique described herein is not limited to any particular locality-sensitive hash technique or implementation; any appropriate or desired locality-sensitive hash technique or implementation may be used. In some embodiments, generating a locality-sensitive hash key at 202 includes obtaining weights for each metadata in the set and using the weights to generate the locality-sensitive hash key. In various embodiments, weights may be specified or otherwise set ahead of time (e.g., when a storage system is being designed), determined upon installation of the backup system (e.g., so that a company in one business may have different weights compared to another customer in another business, depending upon their backup data and its corresponding metadata), generated on the fly, and/or based on a heuristic analysis (e.g., of the operating policies, the data, and/or the environment).

Some pieces of metadata may tend to be more useful in generating a locality-sensitive hash key at 202 which optimizes deduplication performance compared to other pieces of metadata. As such, in some embodiments, the process shown in FIG. 2 does not use all available metadata in generating a locality-sensitive hash at 202. In some embodiments, the set of metadata used at 202 is determined ahead of time (e.g., during the design phase of a backup system) and a predetermined list of metadata to use in generating a locality-sensitive hash is obtained as part of step 200 in FIG. 2. In one example, during the design phase of a backup system, representative backup data and related metadata is input. Various test sets of metadata are selected, and for each test set, locality-sensitive hash keys are generated and the deduplication results are recorded (e.g., the total consumed (backup) storage is recorded for each test set of metadata); the set with the best results may be selected.

In some embodiments, generating a locality-sensitive hash key at 202 includes using the backup data itself (e.g., the content of the data being backed up). For example, if backup data is associated with a file, then in some embodiments a locality-sensitive hash key is based at least in part on the contents of the file. The (backup) data itself may be a good indicator of the uniqueness (or, conversely, the deduplicability) of the (backup) data. For example, it may be desirable to send backup data with the same or similar content to the same deduplication node in order to optimize deduplication performance.

Figure 4:
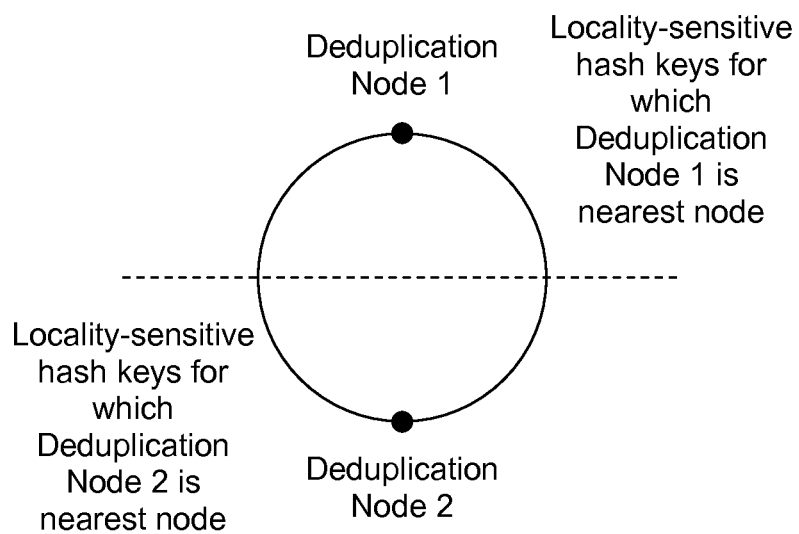
FIG. 4 is a diagram showing an embodiment of backup data assigned to one of two deduplication nodes based at least in part on a locality-sensitive hash key.

The backup data is assigned to one of a plurality of deduplication nodes based at least in part on the locality-sensitive hash key at 204. FIG. 4 is a diagram showing an embodiment of backup data assigned to one of two deduplication nodes based at least in part on a locality-sensitive hash key. Although the example in FIG. 4 shows only two deduplication nodes, the technique may be extended to any number of deduplication nodes. In the example shown, possible locality-sensitive hash keys are angularly represented on a circle (e.g., hash keys are circular in nature, similar to phase). Deduplication node 1 and deduplication node 2 are assigned hash key values that are 180° apart. In this example they are disposed at 90° and 270° on the circle, but any positions or values may be assigned. The deduplication node which is the nearest neighbor to a particular hash key is the deduplication node to which corresponding backup data is assigned. As such, backup data having locality-sensitive hash keys in the top hemisphere are assigned to deduplication node 1 and backup data having locality-sensitive hash keys in the bottom hemisphere are assigned to deduplication node 2.

Using a locality-sensitive hash key to assign backup data to a deduplication node increases the likelihood that like backup data will be grouped with like backup data. Deduplication performs best when similar data is assigned to the same deduplication node, so using locality-sensitive hashing increases the likelihood that deduplication will be optimized and the smallest amount of (backup) storage possible will be consumed.

In some embodiments, using metadata to generate a locality-sensitive hash key is attractive because it is readily accessible in a backup system. For example, as part of a backup process, a backup system may digest, parse, and/or identify metadata associated with the backup data (e.g., because should recovery be requested, metadata is integral to restoring the data in a useable form identical to what was originally on the protected system at the time of the backup). As such, metadata may be readily available within a backup system.

Returning to FIG. 2, the example process shown in FIG. 2 may be repeated as desired. For example, in FIG. 1, the process may be repeated for each piece of backup data that is received at data router 104 from protected system 100. In some embodiments, backup data is received from a protected system in segments and/or out-of-order.

In some embodiments, the example process shown in FIG. 2 is performed in the event one of the deduplication nodes fails or a new deduplication node is added. For example, if a deduplication node fails, the process may be performed on the backup data assigned to the failing deduplication node (or, alternatively, on all backup data on all deduplication nodes) so that all of the backup data is associated with a functioning deduplication node. As such, assignment at 204 is typically limited to functioning deduplication nodes. In some embodiments, the hash-generating algorithm is adjusted; a hash may be intrinsically dependent on the number of nodes to which an assignment is made. Similarly, if a new deduplication node is added, the example process shown in FIG. 2 may be performed, either on the backup data of the two nearest neighbors of the new deduplication node, or on the backup data of all deduplication nodes.

For some backup data, it may be desirable to bypass generation of a locality-sensitive hash key in order to assign backup data to a deduplication node. The following figures give some example situations and alternate processes which are performed when backup data is not assigned to a deduplication node using a locality-sensitive hash key.

Figure 5:
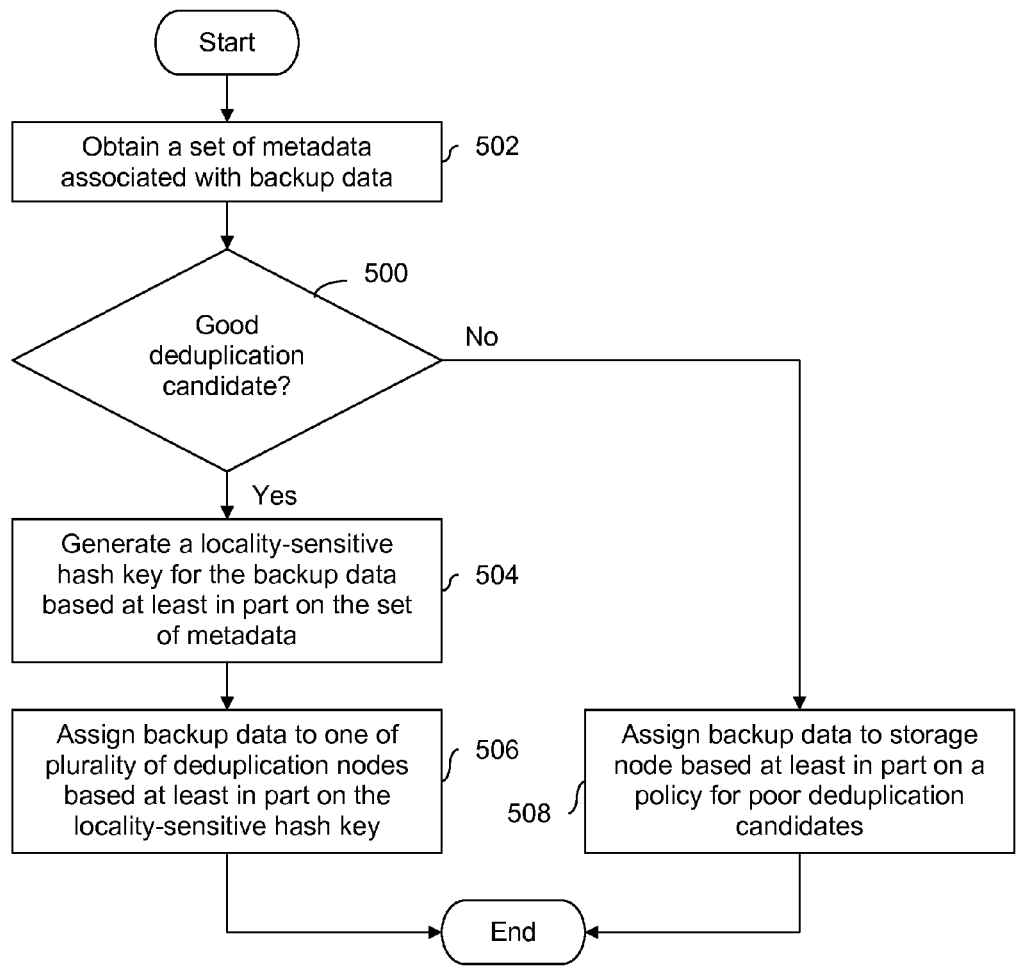
FIG. 5 is a flowchart illustrating an embodiment of a process for assigning backup data to a deduplication node based at least in part on whether the backup data is a good deduplication candidate.

FIG. 5 is a flowchart illustrating an embodiment of a process for assigning backup data to a deduplication node based at least in part on whether the backup data is a good deduplication candidate. In the example shown, a set of metadata associated with the backup data is obtained at 502. It is determined if backup data being processed is a good deduplication candidate at 500. In some embodiments, the determination at 500 is based at least in part on metadata obtained at 502. Some other examples of step 500 are described in further detail below. If it is determined that the backup data being processed is a good deduplication candidate, a locality-sensitive hash key is generated for the backup data based at least in part on the set of metadata at 504, and the backup data is assigned to one of a plurality of deduplication nodes based at least in part on the locality-sensitive hash key at 506. Steps 502-506 are similar to the steps shown in FIG. 2.

If at 500 it is determined that backup data being processed is a poor deduplication candidate, the backup data is assigned to a storage node based at least in part on a policy for poor deduplication candidates at 508. For example, the backup data may be assigned to a storage node associated with that type or kind of backup data. In some embodiments, a storage node to which backup data is assigned at 508 does not perform deduplication (e.g., because the backup data assigned to such nodes are poor deduplication candidates and there is little expected storage savings to be had using deduplication).

For poor deduplication candidates, it may be preferable to bypass steps 504 and 506. For example, some types of files produce relatively divergent binary data even if only a small change in the content has occurred. For example, adding a sentence to a PDF file may cause the resulting PDF file to change drastically from the original PDF file (e.g., at the binary level). Therefore, although the two exemplary PDF files are related, the binaries may be very different and there will be little storage savings even if the two PDF files are assigned to the same deduplication node. As such, it may not be worth the effort of generating a locality-sensitive hash key and using it to assign backup data to a deduplication node. Other poor deduplication candidates include backup data associated with JPEG files and encrypted data. Other poor deduplication candidates include video and audio files (e.g., they tend to be heavily compressed and are therefore poor candidates), database files, random data (e.g., generated from natural phenomena, including but not limited to earth exploration, weather patterns, oil exploration, astronomical data, seismic data, space/ocean exploration, quantum physics (e.g., large hadron collider (LHC) data)), and so on.

Figure 6:
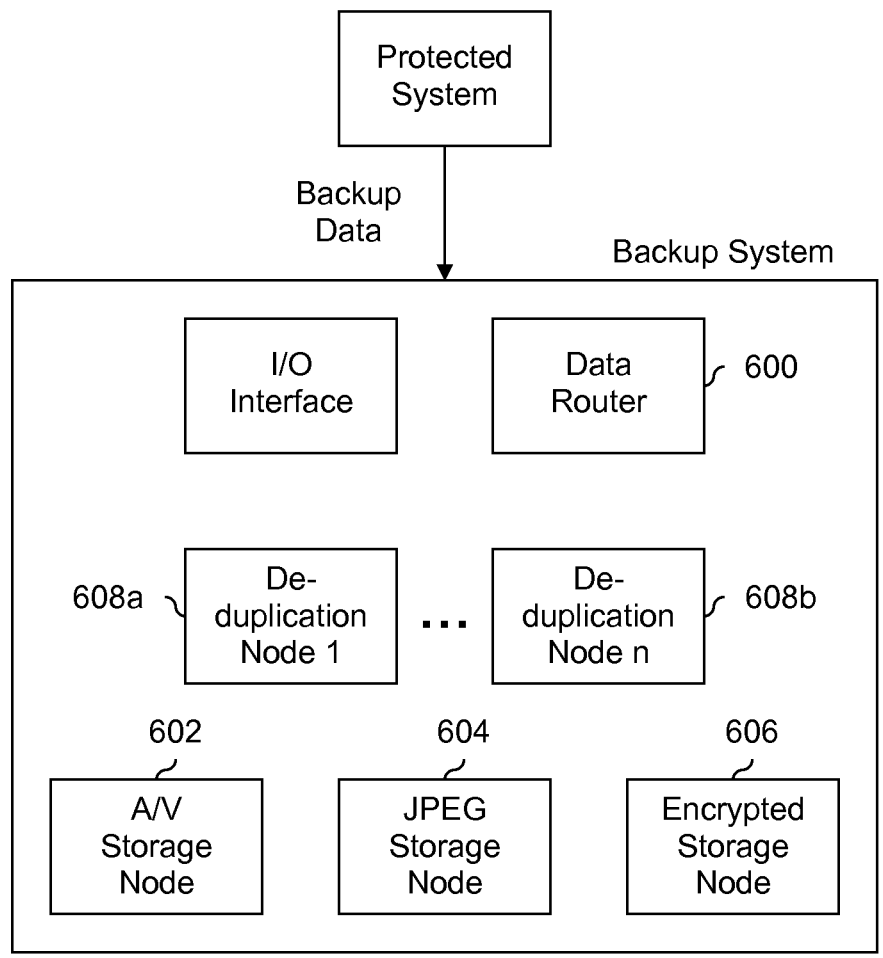
FIG. 6 is a diagram showing an embodiment of a distributed deduplication storage system with storage nodes for poor deduplication candidates.

FIG. 6 is a diagram showing an embodiment of a distributed deduplication storage system with storage nodes for poor deduplication candidates. In the example shown, data router 600 performs the example processes shown in FIG. 5. Backup data associated with audio and/or video data (e.g., fragments or chunks of MPEG files) is determined by data router 600 to be a poor deduplication candidate and the policy used by data router 600 is to assign backup data associated with audio and/or video files to A/V storage node 602. Similarly, backup data associated with JPEG files (e.g., fragments or chunks of JPEG files) and backup data associated with encrypted data are determined by data router 600 to be poor deduplication candidates and are assigned to JPEG storage node 604 and encrypted storage node 606, respectively. In this example, because these kinds of backup data are poor deduplication candidates, storage nodes 602-606 do not perform deduplication.

Alternatively, in some embodiments, a data router may randomly assign a poor deduplication candidate to one of a plurality of deduplication nodes 608a-608b. It may, for example, be desirable for a distributed backup system to have homogenous nodes.

In some embodiments, a company (e.g., which uses a distributed deduplication backup system) may have specific handling requirements for some backup data where it may be desirable to bypass the assignment technique described herein. The following figure describes an example scenario in which backup data which is flagged is assigned to a node according to a policy.

Figure 7:
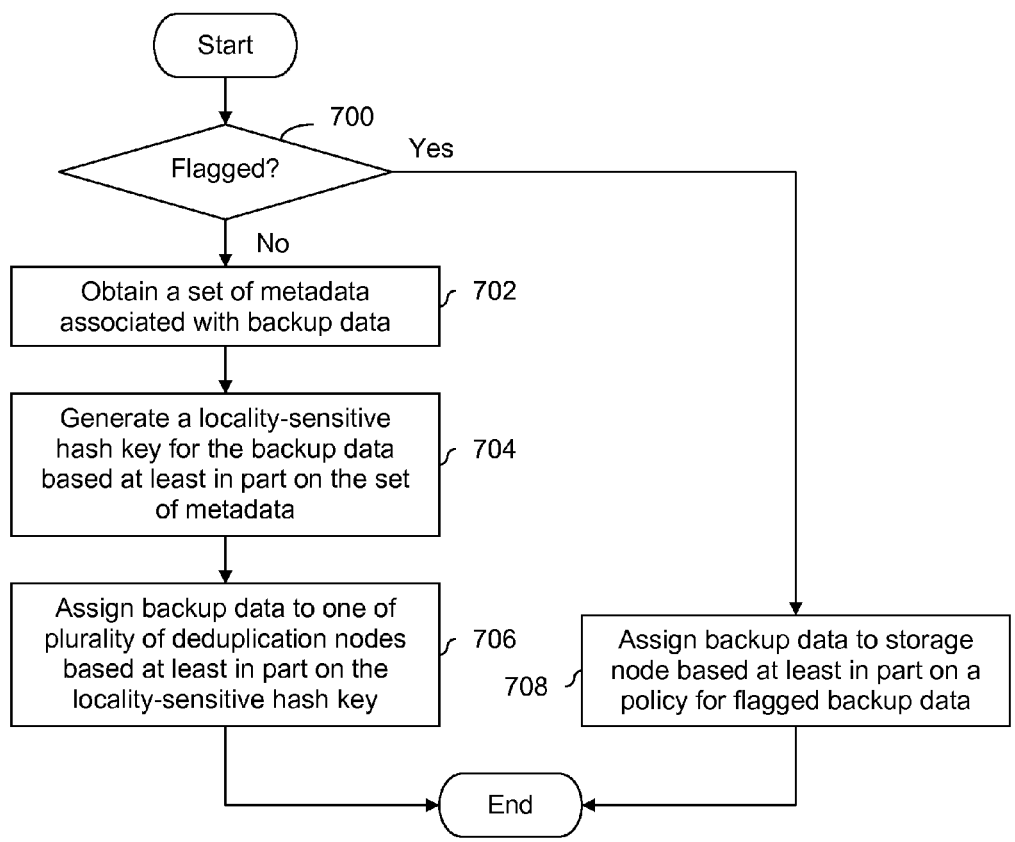
FIG. 7 is a flowchart illustrating an embodiment of a process for assigning flagged backup data to a node in a storage system.

FIG. 7 is a flowchart illustrating an embodiment of a process for assigning flagged backup data to a node in a storage system. In the example shown, the process is performed by a data router in a distributed deduplication backup system associated with a hospital.

At 700, it is determined if the backup data being processed is flagged. For example, backup data from certain source organizations within the hospital (e.g., Medical Department and Billing Department) may be flagged whereas backup data from other source organizations (e.g., Facilities Department and Human Resources Department) is not flagged. In some embodiments, backup data is determined to be flagged at 700 if certain metadata field(s) is/are certain values. For example, backup data may be determined to be flagged if it comes from certain source organizations (e.g., the backup data is determined to be flagged if it comes from the Medical Department or the Billing Department, but it is determined to be not flagged if it comes from the Facilities Department or the Human Resources Department).

If the backup data is not flagged at 700, a set of metadata associated with backup data is obtained at 702, a locality-sensitive hash key for the backup data is generated based at least in part on the set of metadata at 704, and the backup data is assigned to one of a plurality of deduplication nodes based at least in part on the locality-sensitive hash key at 706.

Otherwise, if the backup data is flagged at 700, backup data is assigned to a storage node based at least in part on a policy for flagged backup data at 708. In some embodiments, the policy is to assign the backup data to a storage node associated with a particular source organization. For example, backup data having a source organization of "Medical Department" is assigned to a storage node associated with that source organization and backup data having a source organization of "Billing Department" is assigned to a storage node associated with the billing department. Assigning flagged backup data to a storage node according to a policy may permit specific security, privacy, and/or retention requirements to be enforced at that node, ensuring that backup data is properly managed (e.g., protected, archived, etc.). One example is described in further detail below.

Figure 8:
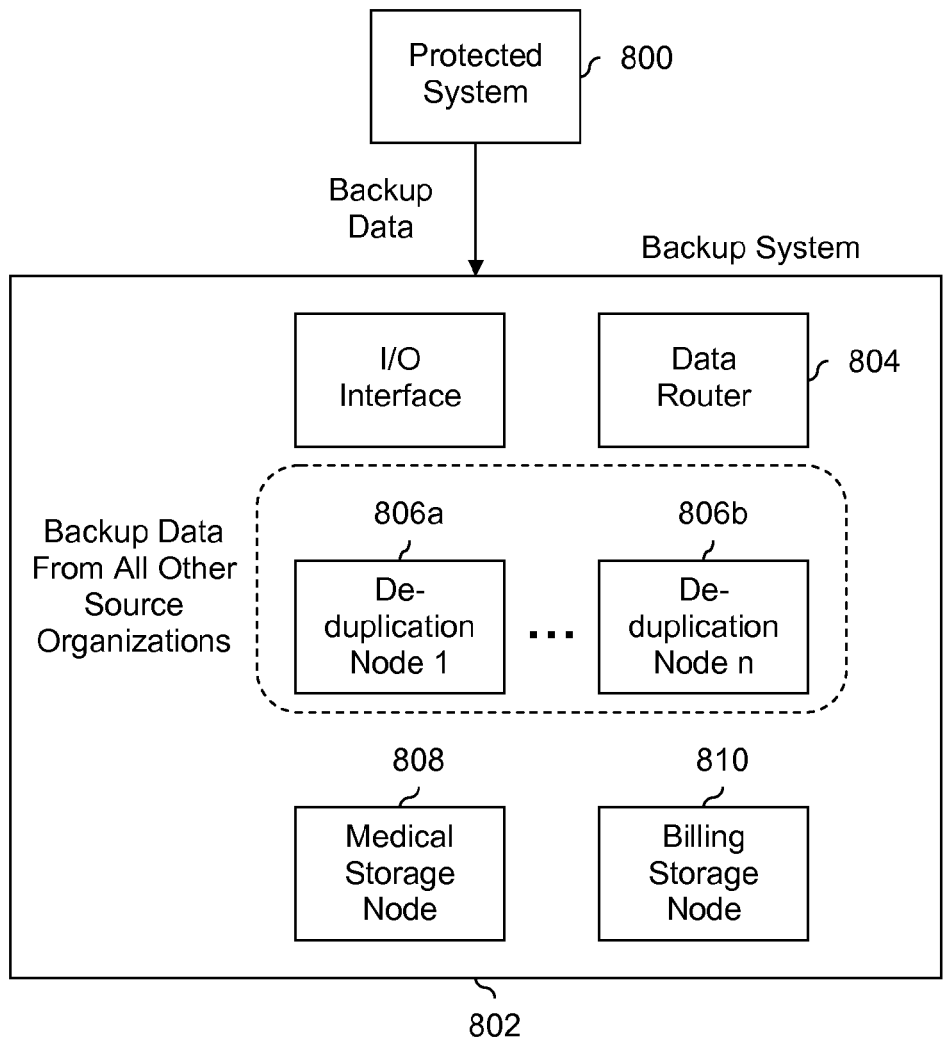
FIG. 8 is a diagram showing an embodiment of a distributed deduplication storage system with storage nodes for flagged backup data.

FIG. 8 is a diagram showing an embodiment of a distributed deduplication storage system with storage nodes for flagged backup data. In the example shown, protected system 800 is associated with a hospital and backup system 802 receives backup data from various source organizations within the hospital, for example, the Medical Department, the Billing Department, the Facilities Department, and the Human Resources Department.

Backup data associated with the Medical Department and the Billing Department are flagged in this example (or, alternatively, data router 804 may determine from examining the metadata associated with the backup data that such backup data comes from the above source organizations). Backup data associated with the Medical Department and the Billing Department are sent, respectively, to medical storage node 808 and billing storage node 810. Storage nodes 808 and 810 may or may not perform deduplication.

In various embodiments, various management policies which are appropriate for the backup data assigned to that node may be enforced at storage nodes 808 and 810. For example, a hospital may be required by law to retain medical records for 10 years. To ensure this requirement is satisfied, a retention policy may be enforced at medical storage node 808, which ensures that the backups of the medical records are kept for at least 10 years. In another example, patient billing information may have sensitive personal information (e.g., date of birth, social security number, etc.) and/or financial information (e.g., credit card number, bank account information, etc.) which needs to be protected. The backup data managed by billing storage node 810 may be encrypted and/or access to backup data stored on billing storage node 810 may be restricted to just a few people. These are just a few exemplary management policies that may be enforced at a storage node. In various embodiments, various management policies associated with (for example) encryption, retention, access, logging, or auditing may be enforced at a node.

In this example, backup data for all other source organizations (e.g., from the Facilities Department and the Human Resources Department) are assigned by data router 804 to one of deduplication nodes 806a-806b using a locality-sensitive hash key.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for processing backup data, comprising:

receiving, from a protected system, a predetermined subset of metadata associated with backup data at a data router in a backup system, wherein the predetermined subset of metadata includes (a) an operating system associated with the protected system, (b) a file type from which the backup data was obtained, and (c) backup-related metadata, including one or more of the following: (1) a backup level associated with the backup data and which specifies if a backup performed on the protected system and which caused the backup data to be generated is associated with one or more of the following: a full backup, an incremental backup, or a differential backup, (2) a backup retention policy associated with the backup data and which specifies a policy for retaining the backup data on the backup system, or (3) a backup data type associated with the backup data and which specifies if the backup performed on the protected system and which caused the backup data to be generated is associated with one or more of the following: a file-based backup or a block-based backup;

using a processor on the data router in the backup system to generate a locality-sensitive hash key for the backup data based at least in part on (a) the operating system, (b) the file type, and (c) one or more of the following: (1) the backup level associated with the backup data, (2) the backup retention policy associated with the backup data, or (3) the backup data type associated with the backup data, wherein:

a first weight associated with the operating system and a first weight associated with the file type are determined when a backup system is installed on a first protected system;

a second weight associated with the operating system and a second weight associated with the file type are determined when a backup system is installed on a second protected system;

generating the locality-sensitive hash key for backup data associated with the first protected system is based at least in part on the operating system, the file type, the first weight associated with the operating system, and the first weight associated with the file type; and generating the locality-sensitive hash key for backup data associated with the second protected system is based at least in part on the operating system, the file type, the second weight associated with the operating system, and the second weight associated with the file type; and assigning the backup data to one of a plurality of deduplication nodes included in the backup system based at least in part on the locality-sensitive hash key.

2. The method of claim 1, wherein assigning includes:

obtaining, for each of the plurality of deduplication nodes, a value; and selecting, from the plurality of deduplication nodes, that deduplication node which has the nearest value greater than or less than the locality-sensitive hash key.

3. The method of claim 1 further comprising:

determining if the backup data is a good deduplication candidate based at least in part on the predetermined subset of metadata;

in the event the backup data is determined to be a good deduplication candidate, performing the steps of using the processor to generate and assigning; and in the event the backup data is determined to be a poor deduplication candidate:

not performing the steps of using the processor and assigning; and assigning the backup data to a storage node based at least in part on a policy for poor deduplication candidates.

4. The method of claim 3, wherein the storage node to which the backup data is assigned based at least in part on the policy for poor deduplication candidates includes a storage node which is not configured to perform deduplication.

5. The method of claim 1 further comprising:

determining if the backup data is flagged;

in the event the backup data is not flagged, performing the steps of obtaining, using the processor to generate, and assigning; and in the event the backup data is flagged:

not performing the steps of obtaining, using the processor to generate, and assigning; and assigning the backup data to a storage node based at least in part on a policy for flagged backup data.

6. The method of claim 5, wherein the policy includes assigning the backup data to the storage node based at least in part on a source organization associated with the backup data.

7. The method of claim 1 further comprising obtaining a list of metadata in which the predetermined subset of metadata to use in generating the locality-sensitive hash key is specified.

8. The method of claim 7 further comprising:

performing an on-going analysis of the plurality of deduplication nodes; and updating the list of metadata based at least in part on the analysis of the plurality of deduplication nodes.

9. The method of claim 1, wherein generating the locality-sensitive hash key for the backup data is based at least in part on all of: (1) the backup level associated with the backup data, (2) the backup retention policy associated with the backup data, and (3) the backup data type associated with the backup data.

10. A system for processing backup data, comprising:

a processor; and a memory coupled with the processor, wherein the memory is configured to provide the processor with instructions which when executed cause the processor to:

receive, from a protected system, a predetermined subset of metadata associated with backup data at a data router in a backup system, wherein the predetermined subset of metadata includes (a) an operating system associated with the protected system, (b) a file type from which the backup data was obtained, and (c) backup-related metadata, including one or more of the following: (1) a backup level associated with the backup data and which specifies if a backup performed on the protected system and which caused the backup data to be generated is associated with one or more of the following: a full backup, an incremental backup, or a differential backup, (2) a backup retention policy associated with the backup data and which specifies a policy for retaining the backup data on the backup system, or (3) a backup data type associated with the backup data and which specifies if the backup performed on the protected system and which caused the backup data to be generated is associated with one or more of the following: a file-based backup or a block-based backup;

generate, on the data router in the backup system, a locality-sensitive hash key for the backup data based at least in part on (a) the operating system, (b) the file type, and (c) one or more of the following: (1) the backup level associated with the backup data, (2) the backup retention policy associated with the backup data, or (3) the backup data type associated with the backup data wherein:
  a first weight associated with the operating system and a first weight associated with the file type are determined when a backup system is installed on a first protected system;
  a second weight associated with the operating system and a second weight associated with the file type are determined when a backup system is installed on a second protected system;
  generating the locality-sensitive hash key for backup data associated with the first protected system is based at least in part on the operating system, the file type, the first weight associated with the operating system, and the first weight associated with the file type; and
  generating the locality-sensitive hash key for backup data associated with the second protected system is based at least in part on the operating system, the file type, the second weight associated with the operating system, and the second weight associated with the file type; and
assign the backup data to one of a plurality of deduplication nodes included in the backup system based at least in part on the locality-sensitive hash key.

11. The system of claim 10, wherein the memory is further configured to provide the processor with instructions which when executed cause the processor to:
  determine if the backup data is a good deduplication candidate based at least in part on the predetermined subset of metadata;
  in the event the backup data is determined to be a good deduplication candidate, perform the steps of generating and assigning; and
  in the event the backup data is determined to be a poor deduplication candidate:
    not perform the steps of generating and assigning; and
    assign the backup data to a storage node based at least in part on a policy for poor deduplication candidates.

12. The system of claim 11, wherein the storage node to which the backup data is assigned based at least in part on the policy for poor deduplication candidates includes a storage node which is not configured to perform deduplication.

13. The system of claim 11, wherein:
  the predetermined subset of metadata includes metadata associated with encryption; and
  the backup data is determined to be a poor deduplication candidate in the event the metadata associated with encryption indicates the backup data is associated with encrypted data.

14. The system of claim 11, wherein:
  the predetermined subset of metadata includes metadata associated with file type; and
  the backup data is determined to be a poor deduplication candidate in the event the metadata associated with file type indicates the backup data is associated with at least one of the following file types: Portable Document Format (PDF) or Joint Photographic Experts Group (JPEG).

15. The system of claim 10, wherein the memory is further configured to provide the processor with instructions which when executed cause the processor to obtain a list of metadata in which the predetermined subset of metadata to use in generating the locality-sensitive hash key is specified.

16. The system of claim 15, wherein the memory is further configured to provide the processor with instructions which when executed cause the processor to:
  perform an on-going analysis of the plurality of deduplication nodes; and
  update the list of metadata based at least in part on the analysis of the plurality of deduplication nodes.

17. The system of claim 10, wherein generating the locality-sensitive hash key for the backup data is based at least in part on all of: (1) the backup level associated with the backup data, (2) the backup retention policy associated with the backup data, and (3) the backup data type associated with the backup data.

18. A computer program product for processing backup data, the computer program product being embodied in a non-transitory computer readable storage medium and comprising computer instructions for:
  receiving, from a protected system, a predetermined subset of metadata associated with backup data at a data router in a backup system, wherein the predetermined subset of metadata includes (a) an operating system associated with the protected system, (b) a file type from which the backup data was obtained, and (c) backup-related metadata, including one or more of the following: (1) a backup level associated with the backup data and which specifies if a backup performed on the protected system and which caused the backup data to be generated is associated with one or more of the following: a full backup, an incremental backup, or a differential backup, (2) a backup retention policy associated with the backup data and which specifies a policy for retaining the backup data on the backup system, or (3) a backup data type associated with the backup data and which specifies if the backup performed on the protected system and which caused the backup data to be generated is associated with one or more of the following: a file-based backup or a block-based backup;
  generating, on the data router in the backup system, a locality-sensitive hash key for the backup data based at least in part on (a) the operating system, (b) the file type, and (c) one or more of the following: (1) the backup level associated with the backup data, (2) the backup retention policy associated with the backup data, or (3) the backup data type associated with the backup data, wherein:
    a first weight associated with the operating system and a first weight associated with the file type are determined when a backup system is installed on a first protected system;
    a second weight associated with the operating system and a second weight associated with the file type are determined when a backup system is installed on a second protected system;
    generating the locality-sensitive hash key for backup data associated with the first protected system is based at least in part on the operating system, the file type, the first weight associated with the operating system, and the first weight associated with the file type; and
    generating the locality-sensitive hash key for backup data associated with the second protected system is based at least in part on the operating system, the file type, the second weight associated with the operating system, and the second weight associated with the file type; and
  assigning the backup data to one of a plurality of deduplication nodes included in the backup system based at least in part on the locality-sensitive hash key.

19. The computer program product of claim 18, wherein the computer instructions for assigning include computer instructions for:

obtaining, for each of the plurality of deduplication nodes, a value; and selecting, from the plurality of deduplication nodes, that deduplication node which has the nearest value greater than or less than the locality-sensitive hash key.

20. The computer program product of claim 18 further comprising computer instructions for:

determining if the backup data is flagged;

in the event the backup data is not flagged, performing the steps of obtaining, generating, and assigning; and in the event the backup data is flagged:

not performing the steps of obtaining, generating, and assigning; and assigning the backup data to a storage node based at least in part on a policy for flagged backup data.

21. The computer program product of claim 20, wherein the policy includes assigning the backup data to the storage node based at least in part on a source organization associated with the backup data.

22. The computer program product of claim 18 further comprising computer instructions for obtaining a list of metadata in which the predetermined subset of metadata to use in generating the locality-sensitive hash key is specified.

23. The computer program product of claim 22 further comprising computer instructions for:

performing an on-going analysis of the plurality of deduplication nodes; and updating the list of metadata based at least in part on the analysis of the plurality of deduplication nodes.

24. The computer program product of claim 18, wherein generating the locality-sensitive hash key for the backup data is based at least in part on all of: (1) the backup level associated with the backup data, (2) the backup retention policy associated with the backup data, and (3) the backup data type associated with the backup data.

\* \* \* \* \*